(12) United States Patent
Huston

(10) Patent No.: US 8,842,003 B2
(45) Date of Patent: *Sep. 23, 2014

(54) GPS-BASED LOCATION AND MESSAGING SYSTEM AND METHOD

(76) Inventor: Charles D. Huston, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/423,423

(22) Filed: Mar. 19, 2012

(65) Prior Publication Data

US 2012/0176411 A1 Jul. 12, 2012

Related U.S. Application Data

(63) Continuation of application No. 12/146,907, filed on Jun. 26, 2008, now Pat. No. 8,207,843, which is a continuation-in-part of application No. 12/111,688, filed on Apr. 29, 2008, which is a continuation-in-part of application No. 11/875,414, filed on Oct. 19, 2007, now Pat. No. 8,249,626, which is a continuation-in-part of application No. 11/624,998, filed on Jan. 19, 2007, now Pat. No. 8,275,397, which is a continuation-in-part of application No. 11/456,715, filed on Jul. 11, 2006, now Pat. No. 7,855,638, and a continuation-in-part of application No. 11/456,723, filed on Jul. 11, 2006, now Pat. No. 7,518,501.

(60) Provisional application No. 60/699,205, filed on Jul. 14, 2005.

(51) Int. Cl.
*G08B 1/08* (2006.01)
*H04W 24/00* (2009.01)
*G01C 21/30* (2006.01)
*H04W 4/02* (2009.01)
*H04L 29/08* (2006.01)
*G06Q 50/00* (2012.01)
*G01S 19/19* (2010.01)

(52) U.S. Cl.
CPC .............. *G06Q 50/01* (2013.01); *H04W 4/02* (2013.01); *H04L 67/18* (2013.01); *G01S 19/19* (2013.01)
USPC .................... 340/539.13; 455/456.3; 455/457; 701/454

(58) Field of Classification Search
USPC .............. 340/426.16–426.23, 539.1–539.21; 455/404.1–404.2, 456.1–457; 701/400–541
See application file for complete search history.

(56) References Cited

U.S. PATENT DOCUMENTS 5,364,093 A 11/1994 Huston et al.
5,802,492 A 9/1998 DeLorme et al.
(Continued)

FOREIGN PATENT DOCUMENTS

EP 1077421 2/2001
EP 1262213 12/2002
(Continued)

OTHER PUBLICATIONS

O'Malley et al., "Human Activity Tracking for Wide-Area Surveillance," University of Florida, Department of Electrical and Computer Engineering, May 2002, 7 pages.

(Continued)

*Primary Examiner* — San Htun
*Assistant Examiner* — Erica Navar
(74) *Attorney, Agent, or Firm* — Charles D. Huston; Daffer McDaniel, LLP

(57) ABSTRACT

A system and method for viewing a target in a background from a user's perspective. In one form, the views are selectable by the user on, for example, a GPS equipped cell phone, to include a view from the participant's position, zoom, pan, and tilt views, or views from another geographic location, giving increased situational awareness and identification of the target. Other information can be conveyed, such as messages or advertisements, on a billboard, which may be a geo-referenced area on or near the target. Preferably, an orientation mechanism shows when the device is correctly pointed to a target.

24 Claims, 10 Drawing Sheets

(56) References Cited

U.S. PATENT DOCUMENTS

| | | | |
|---|---|---|---|
| 5,913,918 A * | 6/1999 | Nakano et al. | 701/454 |
| 6,115,177 A | 9/2000 | Vossler | |
| 6,166,679 A | 12/2000 | Lemelson et al. | |
| 6,195,090 B1 | 2/2001 | Riggins, III | |
| 6,199,015 B1 * | 3/2001 | Curtwright et al. | 701/455 |
| 6,317,127 B1 | 11/2001 | Daily et al. | |
| 6,330,356 B1 | 12/2001 | Sundareswaran et al. | |
| 6,411,266 B1 | 6/2002 | Maguire, Jr. | |
| 6,452,544 B1 * | 9/2002 | Hakala et al. | 342/357.31 |
| 6,578,203 B1 | 6/2003 | Anderson, Jr. et al. | |
| 6,671,390 B1 | 12/2003 | Barbour et al. | |
| 6,721,542 B1 | 4/2004 | Anttila et al. | |
| 6,744,403 B2 | 6/2004 | Milnes et al. | |
| 6,801,516 B1 | 10/2004 | Lomp et al. | |
| 6,879,443 B2 | 4/2005 | Spitzer et al. | |
| 6,885,652 B1 | 4/2005 | Ozukturk et al. | |
| 6,894,994 B1 | 5/2005 | Grob et al. | |
| 6,909,738 B2 | 6/2005 | Akopian et al. | |
| 6,917,644 B2 | 7/2005 | Cahn et al. | |
| 6,920,328 B2 | 7/2005 | Wollrab | |
| 6,996,402 B2 | 2/2006 | Logan et al. | |
| 7,002,551 B2 | 2/2006 | Azuma et al. | |
| 7,031,728 B2 | 4/2006 | Beyer, Jr. | |
| 7,053,780 B1 | 5/2006 | Straub et al. | |
| 7,123,215 B2 | 10/2006 | Nakada | |
| 7,209,035 B2 | 4/2007 | Tabankin et al. | |
| 7,317,705 B2 | 1/2008 | Hanson | |
| 7,353,034 B2 | 4/2008 | Haney | |
| 7,441,198 B2 | 10/2008 | Dempski et al. | |
| 7,546,317 B1 | 6/2009 | Kaptelinin | |
| 7,593,687 B2 | 9/2009 | Anderson, Jr. et al. | |
| 7,716,283 B2 | 5/2010 | Thukral | |
| 7,812,766 B2 | 10/2010 | Leblanc et al. | |
| 8,172,702 B2 | 5/2012 | Meadows et al. | |
| 2002/0038178 A1 | 3/2002 | Talkenberg et al. | |
| 2002/0094853 A1 | 7/2002 | Hayashi | |
| 2002/0154174 A1 | 10/2002 | Redlich et al. | |
| 2002/0188678 A1 | 12/2002 | Edecker et al. | |
| 2003/0032436 A1 | 2/2003 | Mikuni | |
| 2003/0038892 A1 | 2/2003 | Wang et al. | |
| 2003/0109322 A1 | 6/2003 | Funk et al. | |
| 2003/0149496 A1 | 8/2003 | Johnson | |
| 2003/0156134 A1 | 8/2003 | Kim | |
| 2003/0174178 A1 | 9/2003 | Hodges | |
| 2003/0187730 A1 | 10/2003 | Natarajan et al. | |
| 2003/0189589 A1 | 10/2003 | LeBlanc et al. | |
| 2003/0194685 A1 | 10/2003 | Adams | |
| 2004/0036622 A1 | 2/2004 | Dukach et al. | |
| 2004/0051680 A1 | 3/2004 | Azuma et al. | |
| 2004/0104935 A1 | 6/2004 | Williamson et al. | |
| 2004/0147329 A1 | 7/2004 | Meadows et al. | |
| 2004/0161246 A1 | 8/2004 | Matsushita et al. | |
| 2005/0078195 A1 | 4/2005 | VanWagner | |
| 2005/0107952 A1 * | 5/2005 | Hoshino et al. | 701/211 |
| 2005/0143096 A1 | 6/2005 | Boesch | |
| 2005/0148388 A1 | 7/2005 | Vayra et al. | |
| 2005/0207617 A1 | 9/2005 | Sarnoff | |
| 2005/0250458 A1 | 11/2005 | Graham et al. | |
| 2005/0259002 A1 | 11/2005 | Erario et al. | |
| 2006/0015923 A1 | 1/2006 | Chuah et al. | |
| 2006/0075445 A1 | 4/2006 | O'Kane | |
| 2006/0104600 A1 | 5/2006 | Abrams | |
| 2006/0105857 A1 | 5/2006 | Stark | |
| 2006/0136173 A1 | 6/2006 | Case et al. | |
| 2006/0195361 A1 | 8/2006 | Rosenberg | |
| 2006/0262140 A1 | 11/2006 | Kujawa et al. | |
| 2006/0284791 A1 | 12/2006 | Chen et al. | |
| 2007/0024527 A1 | 2/2007 | Heikkinen et al. | |
| 2007/0060408 A1 | 3/2007 | Schultz et al. | |
| 2007/0103292 A1 | 5/2007 | Burkley et al. | |
| 2007/0150444 A1 | 6/2007 | Chesnais et al. | |
| 2007/0179792 A1 | 8/2007 | Kramer | |
| 2007/0191020 A1 * | 8/2007 | Fischer et al. | 455/452.2 |
| 2007/0255831 A1 | 11/2007 | Hayashi et al. | |
| 2007/0265089 A1 | 11/2007 | Robarts et al. | |
| 2007/0282688 A1 | 12/2007 | Buhrow et al. | |
| 2008/0194323 A1 | 8/2008 | Merkli et al. | |
| 2009/0054084 A1 * | 2/2009 | Buhrke et al. | 455/456.3 |
| 2009/0094106 A1 | 4/2009 | Porter et al. | |

FOREIGN PATENT DOCUMENTS

| | | |
|---|---|---|
| EP | 1113669 | 7/2011 |
| JP | 10-154242 | 6/1998 |
| KR | 10-2004-0047692 | 6/2004 |
| KR | 10-2005-0055506 | 6/2005 |
| WO | 01/05476 | 1/2001 |
| WO | 01/36061 | 5/2001 |

OTHER PUBLICATIONS

Barstow et al., "Personalized Interactive Real-Time Sports Reporting Using Java," American Programmer, Jan. 1997, pp. 32-37.

International Search Report, PCT/US2006/027218, mailed Feb. 12, 2007.

Office Action mailed Apr. 14, 2009 for U.S. Appl. No. 11/456,715.

Final Office Action mailed Dec. 28, 2009 for U.S. Appl. No. 11/456,715.

Office Action mailed Mar. 16, 2010 for U.S. Appl. No. 11/456,715.

Notice of Allowance mailed Oct. 4, 2010 for U.S. Appl. No. 11/456,715.

Office Action mailed Apr. 17, 2008 for U.S. Appl. No. 11/456,723.

Final Office Action mailed Oct. 1, 2008 for U.S. Appl. No. 11/456,723.

Notice of Allowance mailed Dec. 15, 2008 for U.S. Appl. No. 11/456,723.

Office Action mailed Oct. 6, 2009 for U.S. Appl. No. 11/624,998.

Office Action mailed Apr. 14, 2010 for U.S. Appl. No. 11/624,998.

Office Action mailed Sep. 1, 2010 for U.S. Appl. No. 11/624,998.

Office Action mailed Feb. 15, 2011 for U.S. Appl. No. 11/624,998.

Office Action mailed Jun. 14, 2011 for U.S. Appl. No. 11/624,998.

Final Office Action mailed Nov. 7, 2011 for U.S. Appl. No. 11/624,998.

Office Action mailed Oct. 6, 2009 for U.S. Appl. No. 11/875,414.

Final Office Action mailed Jun. 22, 2010 for U.S. Appl. No. 11/875,414.

Office Action mailed Dec. 21, 2010 for U.S. Appl. No. 11/875,414.

Final Office Action mailed Jun. 9, 2011 for U.S. Appl. No. 11/875,414.

Office Action mailed Mar. 27, 2012 for U.S. Appl. No. 11/875,414.

Office Action mailed Aug. 8, 2011 for U.S. Appl. No. 12/111,688.

Office Action mailed Mar. 4, 2011 for U.S. Appl. No. 12/146,907.

Final Office Action mailed Jun. 13, 2011 for U.S. Appl. No. 12/146,907.

Office Action mailed Jan. 4, 2012 for U.S. Appl. No. 12/146,907.

Notice of Allowance mailed Mar. 9, 2012 for U.S. Appl. No. 12/146,907.

Office Action mailed Jan. 3, 2012 for U.S. Appl. No. 13/188,030.

Final Office Action mailed Jul. 24, 2012 for U.S. Appl. No. 12/111,688.

Office Action mailed Sep. 10, 2012 for U.S. Appl. No. 13/182,930.

Office Action mailed Aug. 29, 2012 for U.S. Appl. No. 13/188,030.

Office Action mailed Feb. 12, 2013 for EP Application No. 06787161.6.

Office Action mailed Nov. 22, 2012 for pending KR Application No. 10-2008-7003027.

Final Office Action mailed Feb. 6, 2013 for pending U.S. Appl. No. 13/423,423.

Office Action mailed Mar. 7, 2013 for U.S. Appl. No. 13/182,914.

Final Office Action mailed Apr. 8, 2013 for U.S. Appl. No. 13/182,930.

Office Action mailed Sep. 25, 2013 for U.S. Appl. No. 13/182,930.

Final Office Action mailed Sep. 30, 2013 for U.S. Appl. No. 13/182,914.

Office Action mailed Aug. 2, 2013 for U.S. Appl. No. 12/111,688.

Notice of Allowance mailed Aug. 6, 2013 for U.S. Appl. No. 13/605,174.

Office Action mailed Mar. 19, 2014 for U.S. Appl. No. 13/182,914.

* cited by examiner

GPS-BASED LOCATION AND MESSAGING SYSTEM AND METHOD

CONTINUING DATA

This application is a continuation of U.S. patent application Ser. No. 12/146,907 filed Jun. 26, 2008 which is a continuation in part of U.S. patent application Ser. No. 12/111,688 filed Apr. 29, 2008 which is a continuation-in-part of U.S. patent application Ser. No. 11/875,414 filed Oct. 19, 2007 which is a continuation-in-part of U.S. patent application Ser. No. 11/624,998 filed Jan. 19, 2007 which is a continuation-in-part of U.S. patent application Ser. Nos. 11/456,715 and 11/456,723 filed Jul. 11, 2006 both of which claim priority to U.S. Provisional Application No. 60/699,205 filed Jul. 14, 2005; all of which are incorporated herein by reference, and the benefit of 35 U.S.C. §120 is claimed.

BACKGROUND

1. Field of the Invention

This invention relates generally to a GPS-based system and method that displays different views of a target and, in particular, utilizes a user's selected source position to assist in displaying information about the target.

2. Description of Related Art

GPS systems have been used as navigation systems to location destinations. GPS systems have also been used in sports by participants in contests where position, location and distance to features are important. For example, U.S. Pat. No. 5,364,093 describes a GPS system and method for allowing a golfer to tell distance to a hole or other feature, and permits the course to track and manage golfers on the course. NASCAR with Sportsline has developed a GPS system mounted to cars for TV viewers to monitor a race.

GPS systems are becoming much more accurate, inexpensive and robust. GPS antennas and engines are fairly inexpensive and accurate with WAAS to less than 2 meters. In navigation use, the accuracy of GPS can be improved to centimeters, depending on the accuracy required, latency constraints, processing and bandwidth available, etc. Further, communication links are becoming very inexpensive and high bandwidth. For example, WiFi (802.11g) has modems with network signals approaching a 1 mile range, cost less than $5, with bandwidth of 54M bit/sec. Wi-max (802.16) has network signals approaching 30 miles with data rates as high as 70M bit/sec, but is more relevant to fixed installations Future versions of WiFi or other radio technology might be less than $1 with 10-100× bandwidths within a few years (as used herein WiFi refers to current and future versions of wireless local area networks (WLAN) based on the IEEE 802.11 specifications). Other radio technologies are also promising in many applications, such as Zigbee and Ultrawideband.

What has not been done in sports is an integrated GPS system for spectators to more fully enjoy a sport particularly at a remote location. For example, at a NASCAR race, the TV or radio viewing location limits his view of the race and is not his own unique perspective. While watching a race, the spectator might listen to a radio or watch a portable TV, but the perspective is the announcer's or TV angle. Such divergent perspectives—announcer versus personal—can be confusing. Further, a remote spectator might be most interested in the cars he is interested in—the ones near the $3^{rd}$ turn. Other sports would benefit from a system that allows a spectator to more fully integrate the contest information with his desired viewing perspective. In addition to auto racing, football, yachting, horse racing, golf, hockey or any motor sport are candidates for the system and method hereof, especially as size and weight of GPS and radios accompanying a participant decreases.

U.S. Pat. No. 6,744,403 describes a GPS system for tracking objects, such as cars, at a sporting event. See also, U.S. Pat. No. 6,195,090; U.S. Patent Application Publication No. 2006/0105857; U.S. Patent Application Publication No. 2005/0259002. High data rate packet transmission is known, such as U.S. Pat. Nos. 6,894,994; 6,909,738; 6,885,652; 6,917,644; and 6,801,516. Examples of user interfaces, such as PDAs, cell phones, headsets, and the like are described, for example, in U.S. Pat. Nos. 7,053,780; 6,879,443; and 6,115,177. All references cited herein are incorporated by reference.

In navigation and locator GPS-based systems, what is lacking is an integrated GPS system for an individual user to gain situational awareness and to easily identify destinations or other areas of interest. That is, while a user might possess a GPS-enabled cell phone that transmits his position and gives text based directions to a destination, this information gives a very incomplete understanding to visually identify a destination. Such a user might have an overhead view of a map showing the position of the destination on the map, but leaves it up to the user to find and identify the destination.

A particular problem in the area of personal navigation is identifying a place of interest in a confusing environment, such as a crowded street. For example, a cell phone having a GPS might be enabled to identify that a destination is near, but the user cannot locate the destination because of the clutter or environment, e.g. a crowded street or neighborhood or obstructions to the user's line of sight. Users also have difficulty relating how a small mark identifying a place on a map correlates to their position or their view of the environment.

U.S. Pat. No. 7,002,551 describes augmented reality approaches based on digitized video camera or optical as follows:

> Augmented Reality (AR) enhances a user's perception of, and interaction with, the real world. Virtual objects are used to display information that the user cannot directly detect with the user's senses. The information conveyed by the virtual objects helps a user perform real-world tasks. Many prototype AR systems have been built in the past, typically taking one of two forms. In one form, they are based on video approaches, wherein the view of the real world is digitized by a video camera and is then composited with computer graphics. In the other form, they are based on an optical approach, wherein the user directly sees the real world through some optics with the graphics optically merged in. An optical approach has the following advantages over a video approach: 1) Simplicity: Optical blending is simpler and cheaper than video blending. Optical see-through Head-Up Displays (HUDs) with narrow field-of-view combiners offer views of the real world that have little distortion. Also, there is only one "stream" of video to worry about: the graphic images. The real world is seen directly through the combiners, which generally have a time delay of a few nanoseconds. Time delay, as discussed herein, means the period between when a change occurs in the actual scene and when the user can view the changed scene. Video blending, on the other hand, must deal with separate video streams for the real and virtual images. Both streams have inherent delays in the tens of milliseconds. 2) Resolution: Video blending limits the resolution of what the user sees, both real and virtual, to the resolution of the display devices, while optical blending does not reduce the resolution of the real world. On the other hand, an optical approach has the following disadvantages with respect to a video approach: 1) Real and virtual view delays are difficult to match. The optical approach offers an almost instantaneous view of the real world, but the view of the virtual is delayed. 2) In optical see-through, the only information the system has about the user's head location comes from the head tracker. Video blending provides another source of information, the digitized image of the real scene. Currently, optical approaches do not have this additional registration strategy available to them. 3) The video approach is easier to match the brightness of real and virtual objects. Ideally, the brightness of the real and virtual objects should be appropriately matched. The human eye can distinguish contrast on the order of about eleven orders of magnitude in terms of brightness. Most display devices cannot come close to this level of contrast.

AR displays with magnified views have been built with video approaches. Examples include U.S. Pat. No. 5,625,765, titled Vision Systems Including Devices And Methods For Combining Images For Extended Magnification Schemes; the FoxTrax Hockey Puck Tracking System, [Cavallaro, Rick. The FoxTrax Hockey Puck Tracking System. IEEE Computer Graphics & Applications 17, 2 (March-April 1997), 6-12.]; and the display of the virtual "first down" marker that has been shown on some football broadcasts.

U.S. Pat. No. 6,919,867 describes the state of the art in augmented reality approaches as follows:

Virtual reality is used in many diverse fields, such as kitchen design and military training Virtual reality immerses a user in a digital environment, where the user's perceptions of sight and sound are manipulated by a computer. While virtual reality provides inexpensive alternatives to building a mock-up of a kitchen or firing live ammunition during an exercise on a battlefield, virtual reality systems lack the sophistication of human perception.

Virtual reality systems have evolved into augmented reality based systems, where a user's perception of a real environment is augmented with information . . . .

An augmented reality system can be used to provide guidance to a user, for example, providing information during a surgical procedure. A view of a patient's internal anatomical structures may be overlaid onto a real view of the patient. The internal structures are determined and shown in a graphical representation registered with the view of the real patient.

A head-mounted display (HMD) is a desirable means to display an augmented view to a user. Various HMDs are depicted at http://www.cs.unc.edu/us/web/headmounts.htm. A HMD allows the user to vary the viewpoint by turning his or her head. However, HMDs are typically cumbersome, especially over longer periods. The weight of a HMD may put a significant strain on a user's neck and back, especially if the user assumes a pose with a tilted head.

The prior art proposes that the difference between the user's natural eye-point and the viewpoint of the video camera is a concern. The prior art proposes designs which attempt to align an imaging camera with the user's line of sight. Designs have been proposed to further include beam combiners to align the optical axis of a camera and a user, e.g., A. Takagai, S. Yamazaki, Y. Saito, and N. Taniguchi, "Development of a Stereo Video-See-Though HMD for AR Systems," IEEE and ACM Int. Symp. On Augmented Reality—ISAR 2000 (Munich, Germany, Oct. 5-6, 2000), pages 68-77. However, these systems do not address the comfort associated with wearing a HMD, particularly when the user assumes a pose with a tilted head.

For registration between the view of the real environment and the augmenting graphics, the user's viewpoint needs to be tracked. In prior art, head-mounted tracking cameras have been used for optical-see-through displays (where the user sees the real environment through a semitransparent display that shows additional graphics), but not for video-see-through displays. An example-of an optical-see-through HMD with two head-mounted tracking cameras in conjunction with a magnetic tracker is described by Thomas Auer and Axel Pinz in "Building a Hybrid Tracking System: Integration of Optical and Magnetic Tracking", Proceedings of the 2nd IWAR'99, IEEE Computer Society, (IWAR'99, San Francisco, Oct. 20-21, 1999). In the case of video-see-through HMDs, a method has been proposed which uses the views captured by the imaging cameras for tracking, and a magnetic tracker. See State, Andrei, Gentaro Hirota, David T. Chen, William F. Garrett, and Mark A. Livingston. "Superior Augmented-Reality Registration by Integrating Landmark Tracking and Magnetic Tracking" Proceedings of SIGGRAPH 96 (New Orleans, La., Aug. 4-9, 1996); Computer Graphics Proceedings, Annual Conference Series 1996, ACM SIGGRAPH, pgs. 429-438. However, the tracking capabilities exhibited by the known prior art systems are not suitable in a practical setting for tasks needing precise graphical registration.

A video-see-through display can be head-mounted. Tracking, e.g., by optical means, can be added to enable augmented reality visualization. See: F. Sauer, F. Wenzel, S. Vogt, Y. Tao, Y. Gene, and A. Bani-Hashemi, "Augmented Workspace: Designing an AR Testbed," IEEE and ACM Int. Symp. On Augmented Reality—ISAR 2000 (Munich, Germany, Oct. 5-6, 2000), pages 47-53.

Within the field of virtual reality, Fakespace Labs Inc. offers the BOOM (Binocular Omni-Orientation Monitor) personal immersive display for stereoscopic visualization on a counterbalanced, motion-tracking support structure. The BOOM utilizes opto-mechanical shaft encoders for tracking Mechanical tracking requires the boom to be stiff to achieve precise measurements, this can increase the costs associated with a boom mechanism. A boom can be directed by a user's hand or connected to the user's head to free the hands. However, for applications, which need extended use, a head-mounted device can tire the user. In addition, a head-mounted solution is also not very practical if the display needs to be put on and taken off frequently.

SUMMARY OF THE INVENTION

The present invention contemplates a GPS system that provides target area information relevant to the viewer's selected perspective or location or is selectable to view the target area to another location or target. Preferably, the object is a target location, such as a destination location and the target is conveyed in the context of its background environment, such as a row of buildings on a city street. The user preferably has a portable viewing device that accepts the user's GPS derived position and selectively displays a view of the target from the user's perspective or location or selectively from another location. Preferably, the user's portable viewing device includes an orientation indicator so that the user has feedback indicating the device is pointed towards the desired target. That is, the user can selectively view and identify a target from different locations, views, and magnification and the user can tell if the viewing device is oriented correctly. Even remote users can use a device with a network information feed to identify a target. In a preferred form, a geo-referenced billboard is included on or near the target and conveys information to the user. For example, messages such as advertisements or the name of the target can be conveniently displayed on the billboard.

For example, in a NASCAR race, the cars are all equipped with a GPS engine and a communication link to a central server. Each spectator has an internet device has a communication link to the central server. The internet device logs in with the central server, optionally authenticating and telling the server the spectator's selected location and optionally a target location or orientation. During the race, the positions of the cars are broadcast to the spectator's internet device. In one mode, the internet device displays information most relevant to the spectator's selected source location. For example, the position and vital information of the cars nearest the spectator's selected location. In another mode, the internet device has the processing power to take the positions of the cars and the location of the spectator's selection and render a depiction of the cars in real time on the track. The spectator can select the view. For example, the spectator might select "finish line," "overhead," "car 3 driver's view," or "my view."

A spectator might designate the 3rd turn as "my view" selected to see the perspective of the rendering on the internet device to match a view from the 3rd turn—i.e. the source location including elevation. This adds to a much greater enjoyment of the contest because visual data is added to the display which matches the spectator's desired observation. Importantly, the spectator can not only switch views and source locations, but can also tilt or pan the perspective or observation point or zoom. That is, from "my view" the spectator might rotate a toggle up incrementally up (or down) from the horizontal view from the spectator's selected location of the car positions to a vertical view of the contest. Preferably, the toggle would also allow left/right pan at any time.

In addition to the view of the vehicles (or contestants) the spectator can selectively view appended important information. For example, in one mode the user might select no information, in a second mode, the user might select car identification only, while in another mode, the user might select identification plus speed, plus acceleration of one or more selected cars. Other information from car sensors are possible (or derived from GPS information) such as linear or radial G, engine or tire condition, fuel state, etc. Preferably, the spectator could go from a view mode to other modes, such as a display of the current information of the cars in tabular form, a view from a particular camera (streaming video), pit video or rendering, etc. Preferably, the internet device could include a radio (such as WiFi, Zigbee, Ultrawideband, or WiMax) to relay other information such as audio for monitoring car or pit communications or radio broadcasts, or even streaming video of TV broadcasts in, e.g. a separate window.

In "my view," for example, the portable device might display only information to the 3rd turn selected position for cars nearest the 3rd turn. Alternatively, the spectator might want to follow a particular car continuously, e.g. follow car number 8, with selectable views (overheard, turns, stands, head, driver's view). In any of these modes, the spectator could zoom, pan or tilt as described above, freeze, slow motion, replay, etc. In many instances, the spectator might want to view the event from a position of a participant.

While one embodiment is described in the context of a car race such as NASCAR, IRL, NHRA, CART, Formula One, it is easily seen how the system and method of the present invention is applicable to a wide variety of spectator sports. Auto, aircraft, motorcycle, bicycle, boat racing, horse racing, football, soccer and hockey are just a few examples. Even hunting or fishing tournaments or TV shows would benefit from the system and method hereof. For example, a golf spectator (on the course or at home) might use the internet device to follow a particular golfer during a round. Information on the position of the player's golf ball can be supplied from a variety of sources—currently the PGA uses triangulation to acquire the data during play and provides the golf ball position information on its web site. However, the information could easily be gathered by a portable GPS unit accompanying the golfer's caddy or other dedicated data gatherer accompanying the golfer. Once the golf ball position information of each player is gathered, the information is distributed to the spectator based on the spectator's desires. As may be surmised from the NASCAR description above, the golf spectator might select the source viewing position and the target or orientation, determine the angle or view of the graphic rendering, the tilt, pan or zoom of the graphic depiction, the format of the presentation, i.e. graphic of a hole or a tabular summary of all golfers, or one golfer, statistics for a location or hole, etc.

While one limitation to the applicability of the present invention to a spectator sport is the ability to determine the position of a participant, those limitations are becoming less meaningful as technology progresses. For example, with current technology a football player can be fitted with a GPS device and radio that weighs less than ½ pound and is accurate within 2 meters. Foreseeable technology will enable such a device weighing several ounces (mostly battery weight), accurate with WAAS to less than 1 meters and with post-processing to centimeter accuracy. Accuracy to GPS positioning in an outdoor, unobstructed, clutter-free environment will soon be better than one meter. Post-processing at the server can occur in real time (or near real time) to achieve the desired participant accuracy. While the preferred embodiment contemplates obtaining participant location information via GPS, other types of location determination sensors are possible, such as proximity sensors, radar or radio triangulation. See, e.g., U.S. Pat. No. 5,564,698 for tracking hockey pucks, other objects, or people.

While the internet device of one embodiment is a gaming device with GPS and a radio (e.g., WiFi or Zigbee) other types of personal computers, gaming, PDA, and cell phones may equally be used. Further, although one embodiment contemplates broadcasting participant location information to spectators by radio, another embodiment broadcasts information to spectators over the internet. The rendering load of the data might be distributed, i.e., some of the graphics pipeline for the rendering could be accomplished at the server before transmission; other rendering can be performed on the internet device. However, rendering technology is rapidly advancing and becoming increasingly realistic with advances in game technology and as the processing power of the internet device increases and the rendering technology develops, it is anticipated that most of the graphics rendering can be performed at the internet device.

DESCRIPTION OF PREFERRED EMBODIMENTS

Sport System

Figure 1:
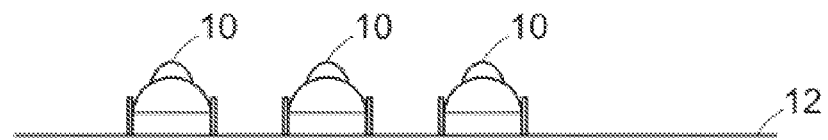
FIG. 1 is a diagram of a screen shot from the internet device showing a head on view of cars on a track.
Figure 2:
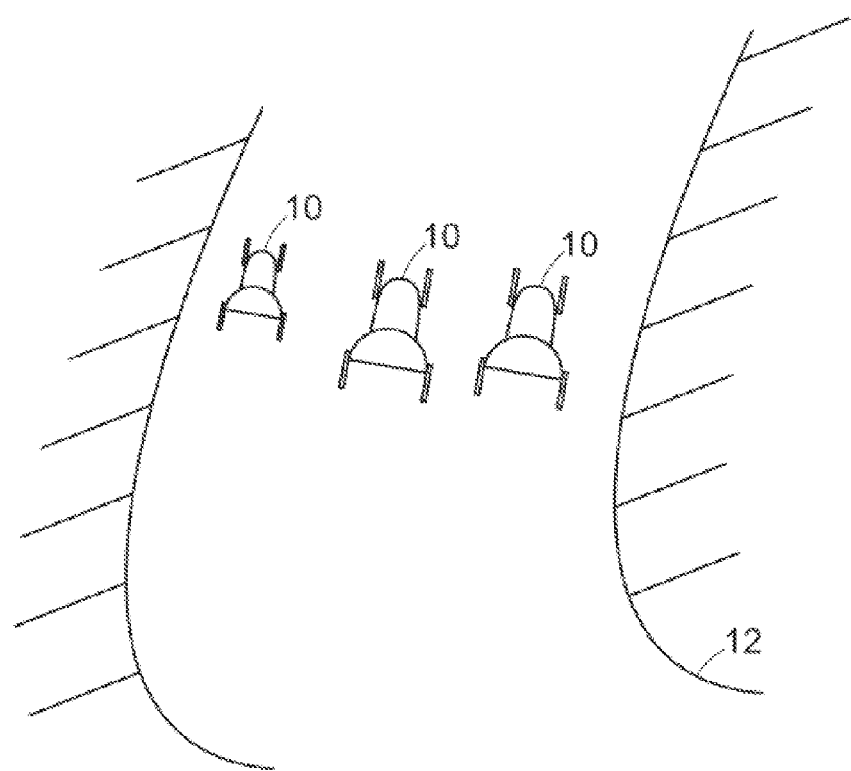
FIG. 2 is a diagram of a screen shot from the internet device showing the cars of FIG. 1 with the rendering tilted up.
Figure 3:
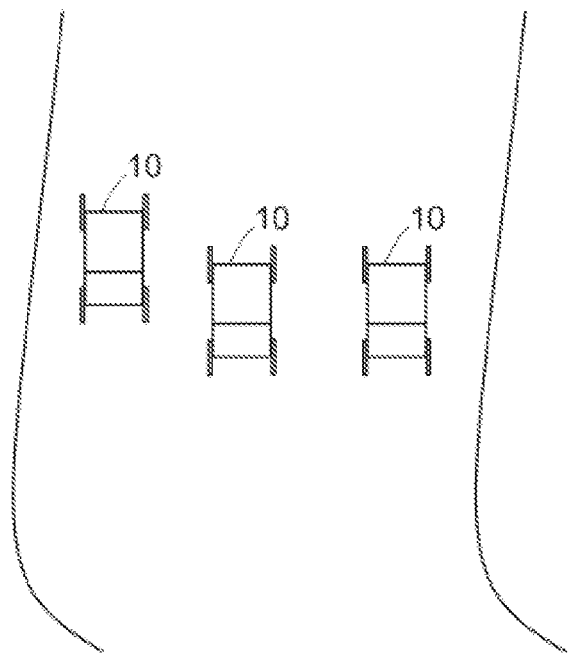
FIG. 3 is a diagram of a screen shot from the internet device showing the cars of FIG. 1 with an overhead view.

Turning to the drawings, cars 10 traverse a track 12. In FIG. 1, the spectator has selected a position at the 3rd turn of an oval track and FIG. 1 is a rendering similar to the spectator's selected view. In FIG. 2, the spectator has tilted upwardly his view so that the spectator has an oblique angle view of the cars 10 of FIG. 1. FIG. 3 is the same depiction of the cars on the track, but the view is further tilted upward to a direct, overhead view of the track 12.

Figure 4:
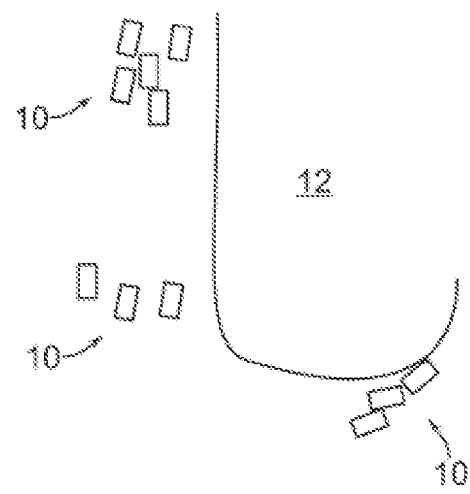
FIG. 4 is a diagram of a screen shot from the internet device showing the cars of FIG. 3 with a zoom out as compared to FIG. 3.
Figure 5:
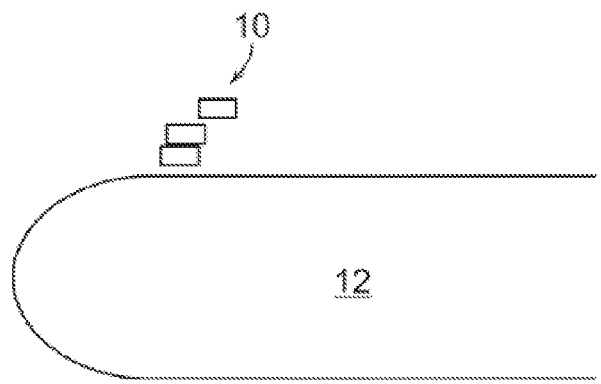
FIG. 5 is a diagram of a screen shot from the internet device showing the cars of FIG. 4 from a different angle or perspective.

FIG. 4 is of a view of the same cars 10 on the track 12 at the same moment in time as FIGS. 1-3, but the view is "zoomed" outwardly changing the scale and allowing the spectator to see more of the cars 10 on the track 12. FIG. 5 is similar in scale to FIG. 4, but the perspective has been changed to the finish line. While the display of the track 12 in FIGS. 1-4 is of an actual race, at time trials the spectator could alternatively obtain from a server a "SimulCam" using technology such as available from Dartfish where each car is superimposed at a certain time into the time trial over the position of other cars.

Of course, other data can be incorporated into the views of FIGS. 4 and 5. In particular, any geographic referenced datasets can be incorporated into a single view which includes aerial or satellite imagery, Street View imagery from Google or Street Level View from Microsoft or Telenav (3D building models), terrain elevation, mapping data or other data such as from Dartfish referenced above. The views, therefore, can be a composite of imagery, virtual (rendered), or augmented reality. The views can be 2D or 3D, and from almost any viewing angle or perspective as described herein. Therefore, in the present application, the term "background" is used to denote a realistic perspective view which can be generated as a photo image, a rendered graphic image with augmented reality, a graphic image outline, or combinations thereof. While the cars are displayed in real time (or nearly so), other data or information can be displayed in real time (or nearly so). Typically, each dataset is treated as a layer in a composition of layers, and placed in exact geographic position and scale—so-called "geographic referenced" or "geo-referenced." 3D perspectives of these combined datasets are rendered. The position of the source or starting viewpoint can be selected by the user.

Preferably, the position of the "source" can be specified, e.g. my position or participant's position (driver of car 3). Additionally, the target or direction can be specified. A particular useful sensor augmentation to the GPS information is a "direction" or orientation finder for the device 20. GPS always tells a bearing to a waypoint from a GPS determined location or source. That is, device 20 can give the user a bearing from the current user location (source) to the meeting point location or rendezvous location for one or more friendly participants. GPS information can give direction of travel when the device 20 is moving. When stopped, the orientation of the device 20 relative to the location of another participant or rendezvous location is useful information. So, in addition to the bearing to the rendezvous location the user could know if the device 20 was oriented in the correct direction—i.e., pointed to the rendezvous location or another participant or target area.

Methods are available for determining orientation of a device using GPS, but usually such GPS methods employ multiple antennas. Other means for determining direction are believed to be preferred, such as a fluxgate compass, INS, gyrocompass, digital compass, fluxgate magnetometers, or multi-axis accelerometers to name a few. Preferably, device 20 includes a direction-determining mechanism which is selectable to another location or a designated participant, and tells the user when device 20 is oriented or pointed correctly to a selected target. Alternatively, the user can select the source (e.g. current location) and the target (e.g. car #3). The user can then additionally deviate from a direct line from the source to the target by, for example, moving the elevation.

Figure 6:
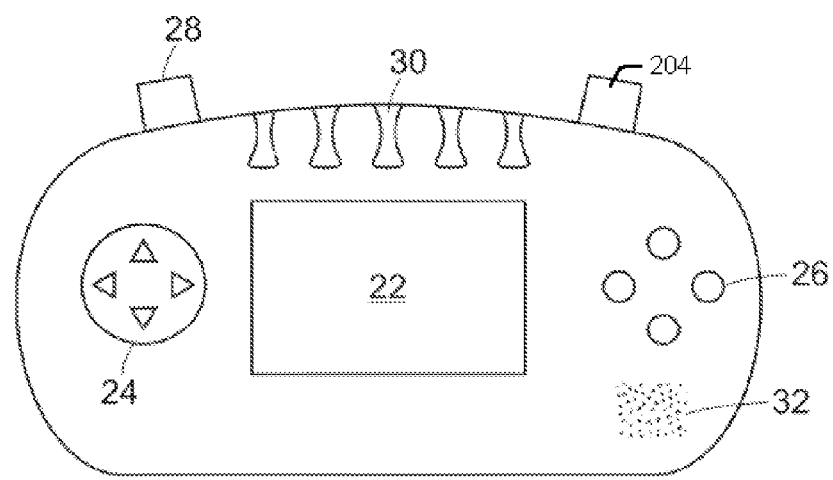
FIG. 6 is a depiction of a portable device.

FIG. 6 is a front elevation of a graphic device 20 carried by the spectators. The depiction is of a gaming device manufactured and sold by Gizmondo, Inc., but other such devices having similar functionality can be substituted. The device 20 includes an LCD screen 22, and an 8 way directional pad 24. Face buttons 26 are near the screen, while triggers 28 are on top of the device 20 as shown. Functional buttons 30 and speaker 32 complete the functional items in the view of FIG. 6. Not shown are the SD card slot, USB or power ports, or a camera. The Gizmondo is powered by a 400 MHz ARM9 processor and has a 2.8 inch 320×240 pixels TFT screen 22 and an NVIDIA 128 bit GeForce 3D 4500 GPU featuring a programmable pixel shader, hardware transform engine, and 1280 KB of embedded memory.

While the device 20 of FIG. 6 uses an ARM 9 processor and Sirf GPS chipset, substitutions can be readily made (e.g. uBlox GPS chipset) as well as substitutions to display 22 and memory capacity. The preferred primary communications radio is GPS tri-band for GPRS but other communication links are easily used. GPRS is a connectivity solution based on Internet Protocols that supports a wide range of enterprise and consumer applications. With throughput rates of up to 40 kbit/s, users have a similar access speed to a dial-up modem, but with the convenience of being able to connect from anywhere. A WiFi communications link can alternatively be used, and encrypted if desired, e.g. using Wired Equivalent Privacy or WEP. Sony, Nintendo, and Playstation all make or intend to make premium game consoles with embedded WiFi. Of course, WiFi outdoors has range issues (although this can be several kilometers with improved antennas and line of sight, particularly at the older 900 MHz bandwidths) and power issues which might make WiFi unsuitable for some applications.

Figure 8:
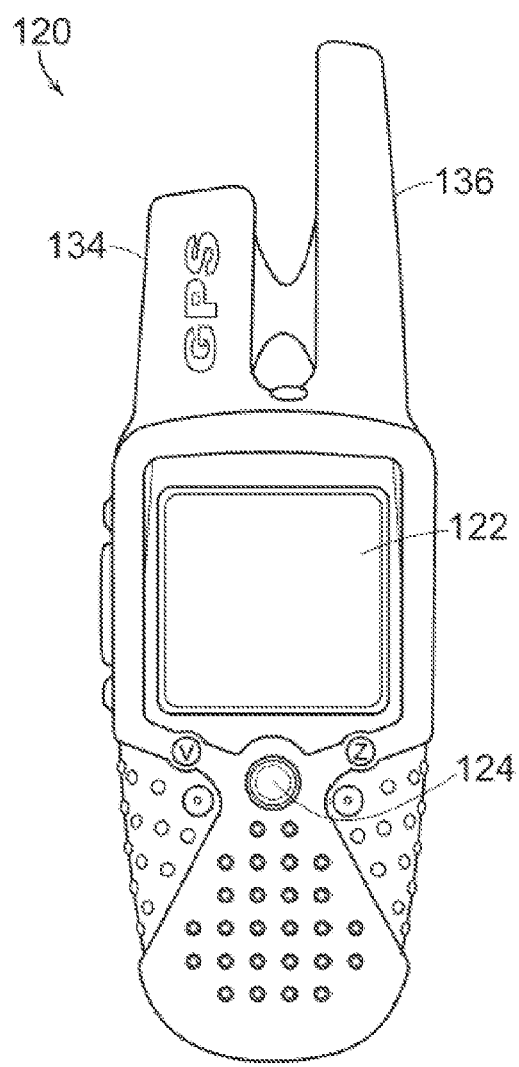
FIG. 8 is a perspective of an alternative embodiment of a portable device, resembling a PDA or a cell phone.
Figure 9:
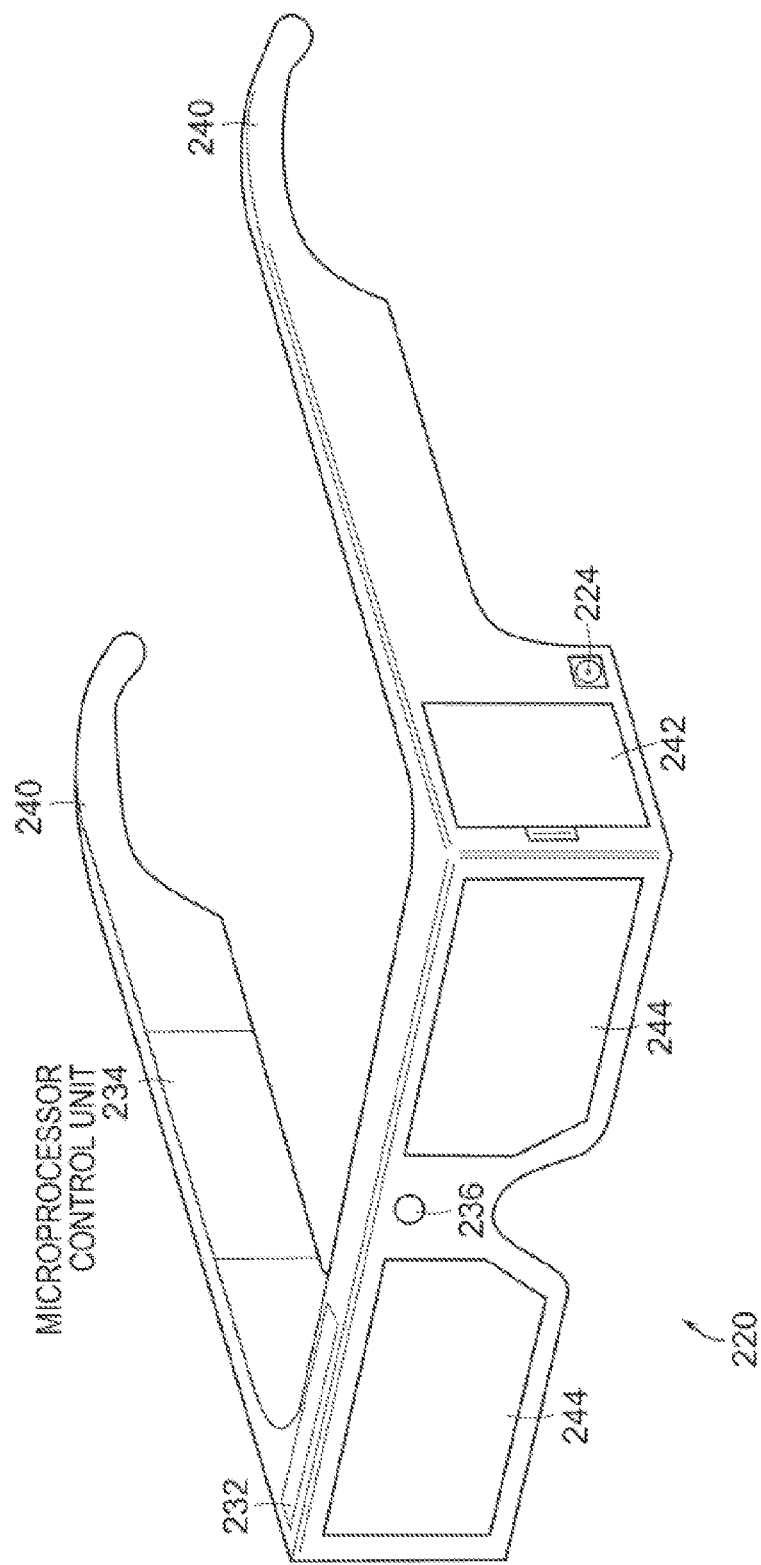
FIG. 9 is a perspective of a portable device where the functionality is built into glasses or goggles worn by the spectator.
Figure 10:
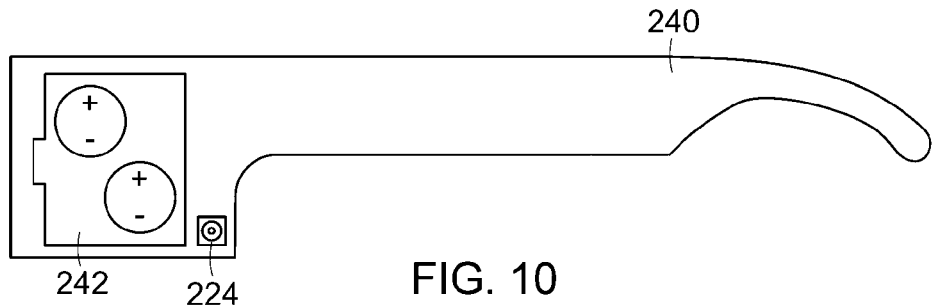
FIG. 10 is a side view of the glasses of FIG. 9.
Figure 11:
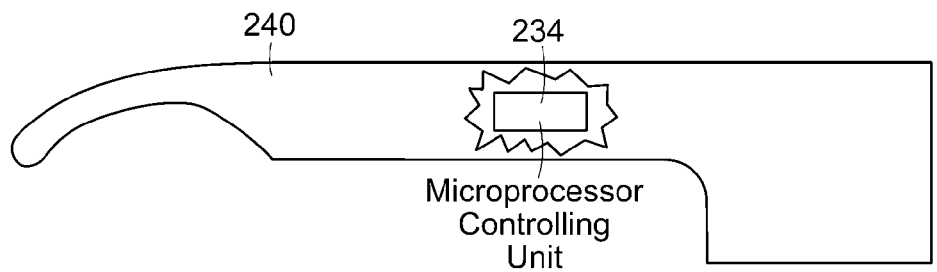
FIG. 11 is a side view of the glasses of FIG. 9 from the other side.
Figure 12:
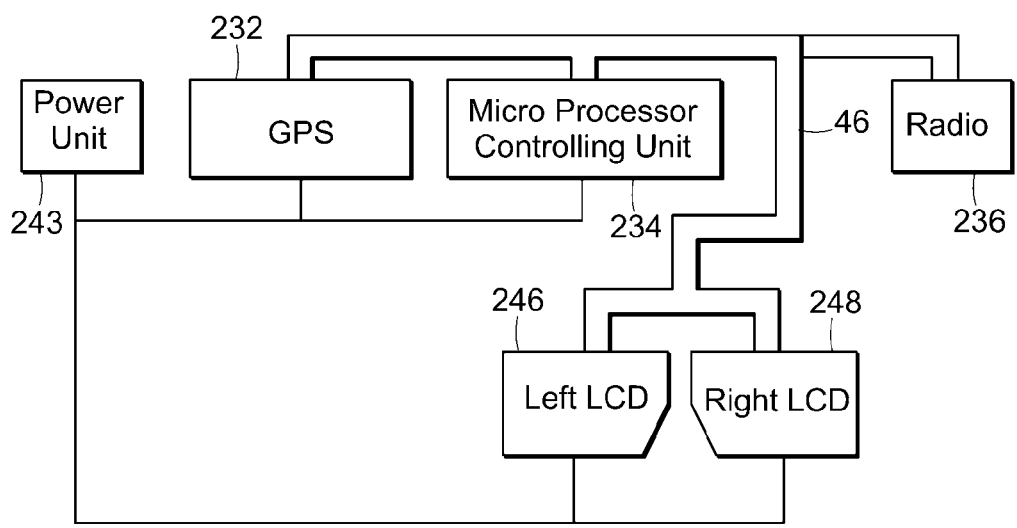
FIG. 12 is a block diagram of the functionality of the glasses of FIG. 9.

FIGS. 8 and 9 each depict an alternative graphic device carried by the spectators. For example, the graphic device 120 of FIG. 8 includes a GPS/antenna 134, communications antenna and radio 136, a display 122, and a directional pad 124. In addition to the Gizmondo type device of FIG. 6, in the near term gaming consoles with GPS and a radio are the best alternatives, such as made by Sony PSP or N Gage OD. However, PDA and cell phone form factors will be viable long term as portable devices, such as Mio A701, HP iPaQ, and Siemens.

Similarly, the graphic device 220 of FIGS. 9-12 is in the configuration of glasses or goggles and includes a GPS and patch antenna 232, microprocessor 234, radio 236. Controls, such as the directional pad 224, are on the side frames (opposite side shown in FIG. 10). Batteries are stored in compartment 242. The displays are transparent LCD's as at 244 and, in particular, are LCD's left 246 and right 248 illustrated in FIG. 12. Examples of such a device are the MyVue headset made by MicroOptical Corp. of Westwood, Mass. (see, U.S. Pat. No. 6,879,443). A particular benefit of the use of wearable glasses such as the embodiment of FIG. 9 is the ability to incorporate augmented reality, e.g. point of interest overlays. The yellow first down marker in football television broadcasts is an example. In this embodiment, a finish line or other point of interest overlays or markers can be highlighted, or a particular participant, or statistics on a particular participant can be viewed. In the NASCAR example, a spectator wearing the FIG. 9 glasses could see the cars, "augmented" track data (finish line) and selectively highlight a particular car and statistics for that car (e.g. fuel remaining, lap time, time back or ahead, mile per hour, miles remaining, etc.) See, e.g., U.S. Pat. Nos. 7,002,551; 6,919,867; 7,046,214; 6,945,869; 6,903,752; 6,317,127 (herein incorporated by reference).

As used herein, GPS is meant to include all of the current and future positioning systems that include satellites, such as the U.S. Navistar, GLONASS, Galileo, EGNOS, WAAS, MSAS, QZSS, etc. The accuracy of the positions, particularly of the participants, can be improved using known techniques, often called differential techniques, such as WAAS (wide area), LAAS (local area), Carrier-Phase Enhancement (CPGPS), Wide Area GPS Enhancement (WAGE), or Relative Kinematic Positioning (RKP). Even without differential correction, numerous improvements are increasing GPS accuracy, such as the increase in the satellite constellation, multiple frequencies ($L_1$, $L_2$, $L_5$), modeling and AGPS improvements, software receivers, and ground station improvements. Of course, the positional degree of accuracy is driven by the requirements of the application. In the NASCAR embodiment of the preferred embodiment, two meter accuracy provided by WAAS would normally be acceptable.

Figure 7:
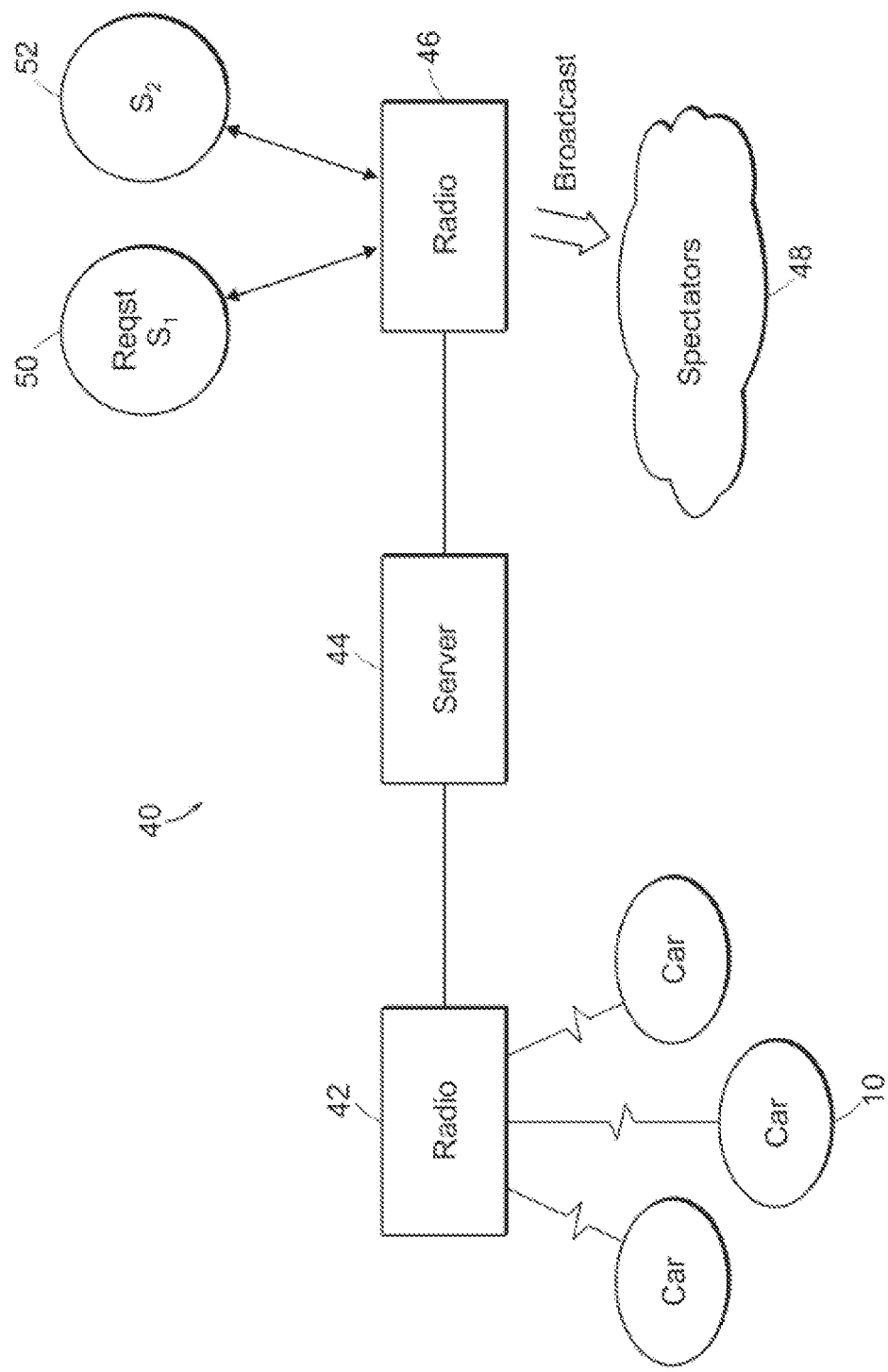
FIG. 7 is a block diagram depicting the network at a racetrack.

In FIG. 7, a depiction of the network 40 is shown. The cars 10 communicate with a radio base station 42 preferably using spread spectrum radio (encrypted or secured if desired). A spread spectrum radio such as made by Freewave Technologies of Boulder, Colo. is a preferred choice (e.g. a 900 MHz board level module). The server 44 stores the position data of each car 10 communicated to the base station 42, and other pertinent data such as car sensor data, etc. Ideally, the server 44 can also digitally store the voice communications of interest (e.g. pit to driver) and video clips of various scenes of possible interest. Of course, the server 44 can store advertising messages as well for delivery to spectators. The server 44 can also be used for authentication of graphic devices 20 and enable selectable purchases from spectators (i.e. refreshments or memorabilia for delivery). The server 44 can also process the incoming position data to increase the accuracy if desired. For example, the server 44 can include its own base station GPS and apply a correction to a participant's position if desired. In some sports, the participants might broadcast location information directly to spectators, i.e. without an intervening server. The radio 46 is used to communicate on a broadcast basis to all spectators 48—here using a GSM tri-band, the GPS position information of the cars 10 (encrypted or secured if desired). The devices 20 in the hands of the spectators 48 processes the position information to render the views illustrated for example in FIGS. 1-5.

While the preferred embodiment contemplates most processing occurring at device 20, different amounts of preprocessing of the position data can be processed at the server 44. For example, the participant information can be differentially corrected at the server (using e.g. either WAAS or a local area differential correction) or even information post-processed with carrier phase differential to achieve centimeter accuracy. Further, it is anticipated that most of the graphics rendering can be accomplished at the portable device 20, but an engineering choice would be to preprocesses some of the location and rendering information at the server 44 prior to broadcast.

Graphics

The graphics generated on the screen 22 can be 2D graphics, such as geometric models (also called vector graphics) or digital images (also called raster graphics). In 2D graphics, these components can be modified and manipulated by two-dimensional geometric transformations such as translation, rotation, scaling. In object oriented graphics, the image is described indirectly by an object endowed with a self-rendering method—a procedure which assigns colors to the image pixels by an arbitrary algorithm. Complex models can be built by combining simpler objects, in the paradigms of object-oriented programming. Modern computer graphics card displays almost overwhelmingly use raster techniques, dividing the screen into a rectangular grid of pixels, due to the relatively low cost of raster-based video hardware as compared with vector graphic hardware. Most graphic hardware has internal support for blitting operations and sprite drawing.

Preferably, however, the graphics generated on screen 22 are 3D. OpenGL and Direct3D are two popular APIs for the generation of real-time imagery in 3D. (Real-time means that image generation occurs in 'real time', or 'on the fly') Many modern graphics cards provide some degree of hardware acceleration based on these APIs, frequently enabling the display of complex 3D graphics in real-time. However, it's not necessary to employ any one of these to actually create 3D imagery. The graphics pipeline technology is advancing dramatically, mainly driven by gaming applications enabling more realistic 3D synthetic renderings of FIGS. 1-5.

3D graphics have become so popular, particularly in computer games, that specialized APIs (application programmer interfaces) have been created to ease the processes in all stages of computer graphics generation. These APIs have also proved vital to computer graphics hardware manufacturers, as they provide a way for programmers to access the hardware in an abstract way, while still taking advantage of the special hardware of this-or-that graphics card.

These APIs for 3D computer graphics are particularly popular:

OpenGL and the OpenGL Shading Language
OpenGL ES 3D API for embedded devices
Direct3D (a subset of DirectX)
RenderMan
RenderWare
Glide API
TruDimension LC Glasses and 3D monitor API There are also higher-level 3D scene-graph APIs which provide additional functionality on top of the lower-level rendering API. Such libraries under active development include:
- QSDK
- Quesa
- Java 3D
- JSR 184 (M3G)
- NVidia Scene Graph
- OpenSceneGraph
- OpenSG
- OGRE
- Irrlicht
- Hoops3D Photo-realistic image quality is often the desired outcome, and to this end several different, and often specialized, rendering methods have been developed. These range from the distinctly non-realistic wireframe rendering through polygon-based rendering, to more advanced techniques such as: scanline rendering, ray tracing, or radiosity. The rendering process is computationally expensive, given the complex variety of physical processes being simulated. Computer processing power has increased rapidly over the years, allowing for a progressively higher degree of realistic rendering. Film studios that produce computer-generated animations typically make use of a render farm to generate images in a timely manner. However, falling hardware costs mean that it is entirely possible to create small amounts of 3D animation on a small processor, such as in the device 20. Driven by the game studios, hardware manufacturers such as ATI, Nvidia, Creative Labs, and Ageia have developed graphics accelerators which greatly increase the 3D rendering capability. It can be anticipated that in the future, one or more graphics rendering chips, such as the Ageia Physx chip, will be added to the device 20.

While full 3D rendering is not possible with the device 20 described herein, advances in processing and rendering capability will enable greater use of 3D graphics in the future. In a particular application, such as NASCAR, a car object and a track object (e.g., Taladega) can be rendered in advance and stored, making realistic 3D graphics possible. In 3D computer graphics, the terms graphics pipeline or rendering pipeline most commonly refer to the current state of the art method of rasterization-based rendering as supported by commodity graphics hardware. The graphics pipeline typically accepts some representation of a 3D scene as an input and results in a 2D raster image as output.

Requests

Special requests from spectators 48 can be made to the server 44, such as for streaming video of a particular scene or audio of a particular car 10, refreshment orders, memorabilia purchases, etc. This function is shown at 50, 52 in FIG. 7.

While one embodiment has been described in the context of a spectator in physical attendance at a sporting event with information broadcast by radio, the use of the graphic devices 20 at remote locations is equally feasible. In another embodiment more suited for remote locations, for example, the portable device 20 can be used at home while watching a sporting event on TV, with the participant location and other information streaming over the internet. WiFi in the home is a preferred mode of broadcasting the information between the portable device and the network.

Using graphic device 20 at home while watching the same sporting event on TV is believed to be a preferred embodiment for use at remote locations. However, other examples of remote location of a sporting event viewing might not be accompanied by watching TV. That is, the views of FIGS. 1-5 can be accomplished using any graphic device, including a personal computer or a cell phone. Similar to using the graphic device 20 coupled to the internet, a personal computer user can select the source or position of origination of the desired view, and the target or orientation from the source or target. Elevations, zoom, pan, tilt, etc. may be selected by the remote user as described above.

In "my view," for example, the remote location graphic device might display only information to the 3rd turn spectator for cars nearest the 3rd turn. Alternatively, the remote location spectator might want to follow a particular car continuously, e.g. follow car number 8 (or particular golfer, etc.), with selectable views (overheard, turns, stands, head, driver's view). In any of these modes, the remote location spectator could zoom, pan or tilt as described above, freeze, slow motion, replay, etc. to obtain a selected view on the graphic device.

Locator and Messaging System

Figure 13:
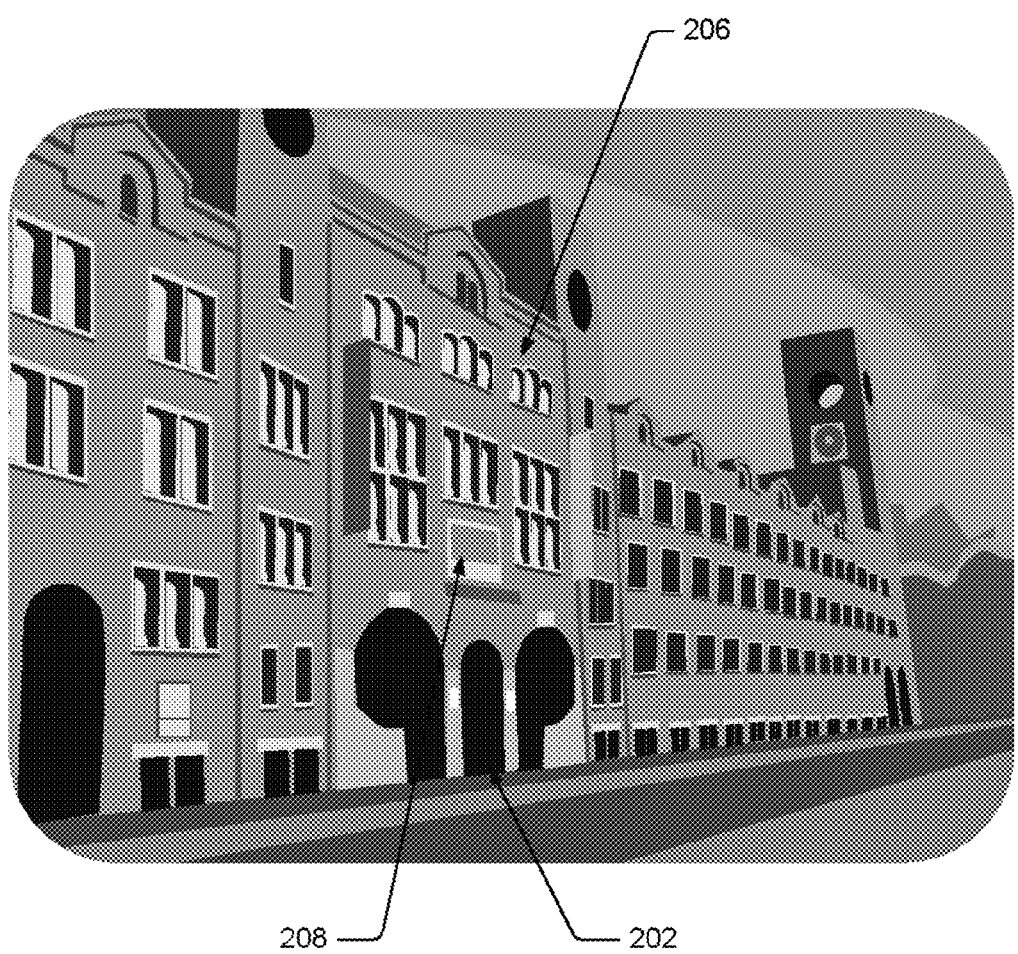
FIG. 13 is a perspective view of a target area along a street.
Figure 14:
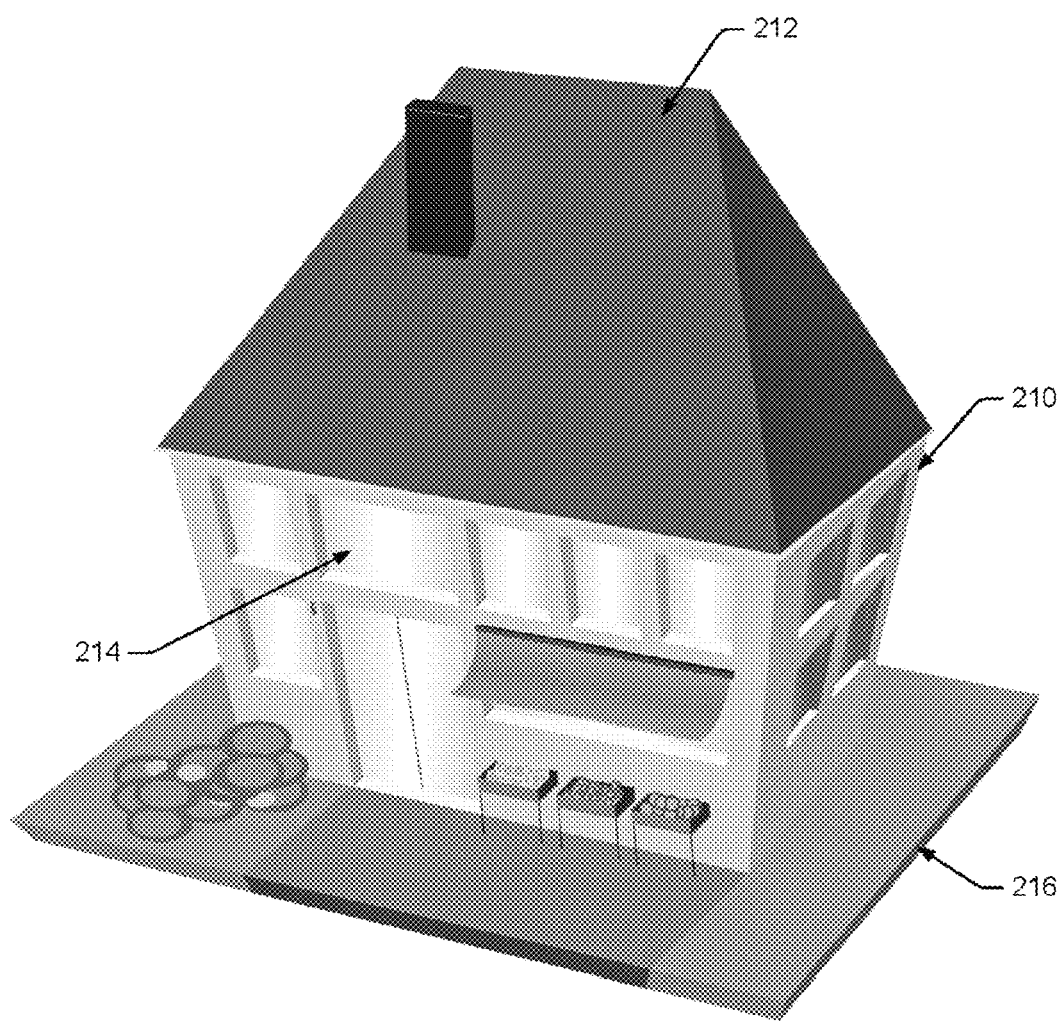
FIG. 14 is a perspective view of a target area comprising a building.
Figure 15:
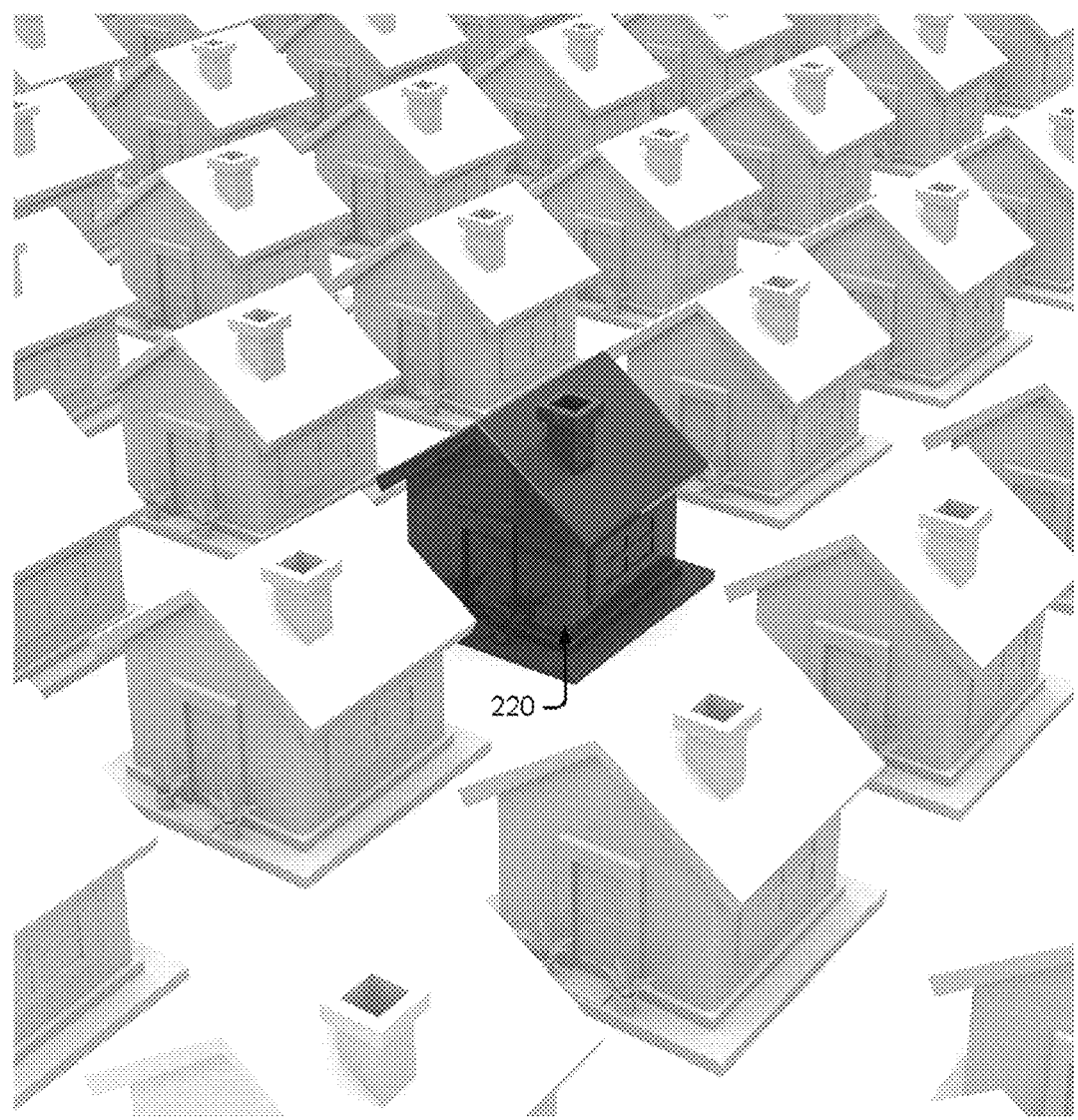
FIG. 15 is a perspective view of a target area comprising a house in a neighborhood.

Another preferred embodiment is a GPS-enabled system and method for locating people, places or things. Such a system is illustrated generally in FIGS. 13-15. FIGS. 13-15 are intended to show a "background" depiction of a target area or location from a designated perspective view. For example, FIG. 13 shows "my view" from a user's location to the target area. In one embodiment, the background of FIG. 13 is as seen by the user and also displayed on device 20. As noted above, the user of device 20 can select the position of the "source" for the view and can move the source. Further, the user can zoom, pan, tilt, go to an overhead view, or utilize the other options available on device 20 as described above.

In a basic example, the user is trying to find a restaurant 202. The geographic location of restaurant 202 is retrieved by a radio link as described above, or from a database in device 20. FIG. 13 is geo-referenced to the designated "source" which, in this example, is the location of the user. Advantageously, device 20 tells the user when device 20 is oriented in the correct direction to restaurant 202 (target). See, e.g., light 204 in FIG. 6. While FIG. 6 depicts a light that illuminates when device 20 is correctly oriented (e.g. +/−10') from the source to the target, other examples will be readily appreciated. For example, a light on screen 22 can be depicted or a direction heading can be depicted (e.g. 250° or 250 degrees). Further, restaurant 202 itself can be outlined or marked with a designation on screen 22.

While the basic example assumes the user has selected the user's location as the source location to find restaurant 202 from a street level view, the user can shift the source location as described herein. Further, the user can preview the perspective view remotely, e.g., over the internet, to understand how the target will appear, for example when transiting from the subway exit.

Because of the advances described above in connection with geo-referencing, street view and the accuracy of maps and other GIS systems, the location of building 206 housing, and restaurant 202 in FIG. 13 can be very precise, as well as the details of building 206. In particular, the location of billboard area 208 on the face of building 206 can be precise and geo-referenced.

Billboard 208 has a variety of optional uses. In one example, rather than designating target restaurant 202 with an outline or arrow, billboard 208 can contain the name of restaurant 202. Alternatively, billboard 208 can be used for conveying a message to the user. A typical message would be a relevant advertisement. For example, the user has already designated restaurant 202 as the target location; therefore, an advertisement for a dinner special or a particular drink would be relevant.

Of course, other messages can be conveyed using more conventional designations such as sidebar advertisements, pop-up balloons with advertisements or messages, click info, banner ads, etc. However, billboard 208 area may be convenient as an area that does not interfere with other features of the target. Other examples of billboard 208 can be large windows, open facades, real or artificial signs, doorways, or the like. Because the billboard is geo-referenced and the information is in the digital domain, the message on the billboard stays in the same location on the building as the user's view changes.

As described above, device 20 used in the locator and messaging system embodiment hereof does not need to be in wireless communication. However, it is believed preferable to utilize wireless communication so that different targets can be designated and downloaded, rendering can be shared with a central server, and location of the user can be shared. In particular, sharing the user's location (as designated by the user) with friends, people or establishments has certain advantages. For example, friends waiting within restaurant 202 can be alerted when the user is within a designated range or rendezvous time. Further, restaurant 202 can be alerted that a dinner reservation is on the street entering the restaurant.

FIGS. 14 and 15 are further examples of the locator and messaging system of the present invention. In FIG. 14, the target is a grocery 210 and the user, instead of selecting his own location as the source, has selected an elevated location, zoomed in, as the source. Billboard areas 212, 214, and 216 are depicted for messages, e.g. advertising, as described herein.

FIG. 15 shows a target of a house in a neighborhood 220. In FIG. 15, the house target is shown in a different color or highlight on the screen of device 22. Further, billboard area 222 conveys the message of the target destination—"Joe and Alice House"—and illustrates a billboard detached from the location of target 220.

What is claimed:

1. A method for observing a target in a background environment comprising:
    equipping a user with a device having a display operable to show a target and augmented reality information overlaying the target, and a Global Positioning System (GPS) receiver for determining the position of the user's device;
    communicating the target position to the user's device;
    viewing on the display of the user's device a perspective view of the target in the background environment; and
    viewing on said perspective view, with an orientation of the user's device in an approximate direction from the user's device to the target position, geo-referenced information appended to said target based on said target position, and displayed on the display to convey information to the user, wherein the geo-referenced information is an augmented reality overlay appended to the target that remains in a same location appended to the target from different user-perspective views.

2. The method of claim 1, wherein the device includes a digital compass for determining the orientation of the user's device.

3. The method of claim 1, wherein the geo-referenced information appended to the target comprises a geo-referenced billboard on the target and displays appended information relevant to the target on the display.

4. The method of claim 1, wherein the user position is transmitted to a server, wherein the user's device communicates with said server, and wherein the server communicates the appended information as geo-referenced billboard information to the user's device.

5. The method of claim 1, including determining the orientation of the user's device.

6. In a system for displaying information to a user in an environment having a server for transmitting object information to the user, comprising:
    a portable device adapted to accompany a user, the portable device including a radio for receiving said object information from said server;
    a Global Positioning System (GPS) receiver for determining the position of the portable device; and
    a transparent display comprising glasses worn by the user operable to show the object and augmented reality information overlaying the object where one view is a depiction of the environment background in a perspective view from said user's position with said object information comprising an artificial reality overlay displayed in a billboard area fixed in geo-reference to said object in said environment background, and a second perspective view displays said object information in said billboard area.

7. The system of claim 6, including a direction indicator for indicating when the portable device is oriented approximately to the bearing from the position of the portable device to the position of the billboard.

8. The system of claim 6, wherein said portable device comprises a cell phone tethered to said glasses which include the GPS receiver for determining position and publishes said position and identity to the cellular network.

9. The system of claim 7, wherein said glasses worn by the user have a transparent lens operable to view the object and overlaying object information simultaneously.

10. The system of claim 7, wherein the direction indicator includes an orientation mechanism.

11. The system of claim 10, wherein the orientation mechanism is a compass.

12. The system of claim 6, wherein said object is a target and said object information in said billboard area includes a message relevant to said target.

13. The system of claim 6, wherein said object information in said billboard area is an advertisement.

14. The system of claim 6, wherein said object information in said billboard area includes a message relevant to the user.

15. The system of claim 6, wherein when the user's position changes to create said second perspective view, the billboard information remains fixed in geo-reference to said object in said environment background in said second perspective.

16. The system of claim 6, wherein said environment is a video image and said object information in said billboard area comprises an augmented reality.

17. The system of claim 9, wherein said object information in said billboard area comprises an augmented reality overlay displayed on said glasses.

18. A method of viewing information appended to an object comprising a billboard on the object in an environment background by a mobile user comprising:
    equipping said mobile user with a device having a Global Positioning System (GPS) receiver and a display operable to show a target and augmented reality information overlaying the target;
    determining a source viewpoint position of the mobile user using said device accompanying the user;
    defining a billboard area geo-referenced on the object for displaying said appended information;
    receiving appended information on the device;
    displaying on the device a perspective view of said billboard in the environment background, wherein the perspective view is generally from said source viewpoint position to the billboard area; and displaying in the billboard area at least some of the appended information as an augmented reality overlay, wherein upon changing the perspective view to another perspective view, the billboard area stays in the same location on the object, and said appended information is displayed in each perspective view in the billboard area.

19. The method of claim 18, wherein said device includes a digital compass for determining an orientation of the device.

20. The method of claim 18, wherein the object is a target and the geo-referenced billboard area displays appended information relevant to the target on the display.

21. The method of claim 18, wherein the geo-referenced billboard area displays appended information relevant to the user on the display.

22. The method of claim 18, wherein the geo-referenced billboard area displays an advertisement on the display.

23. The method of claim 18, wherein the device comprises glasses worn by the user having a transparent lens operable to view the object and overlaying appended information simultaneously.

24. The method of claim 18, wherein the object is a building and the billboard area does not interfere with other building features.

* * * * *